United States Patent Office 3,340,316
Patented Sept. 5, 1967

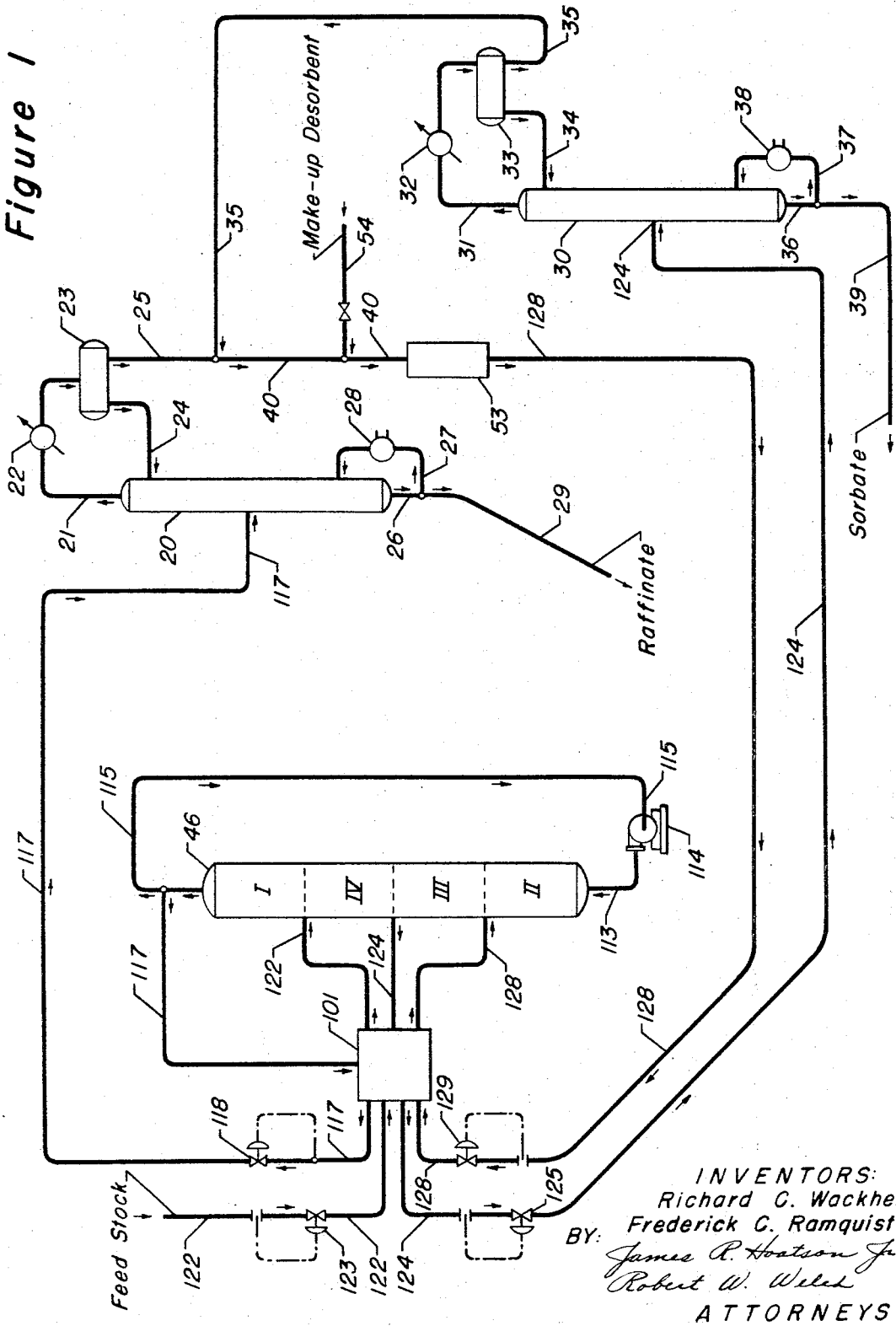

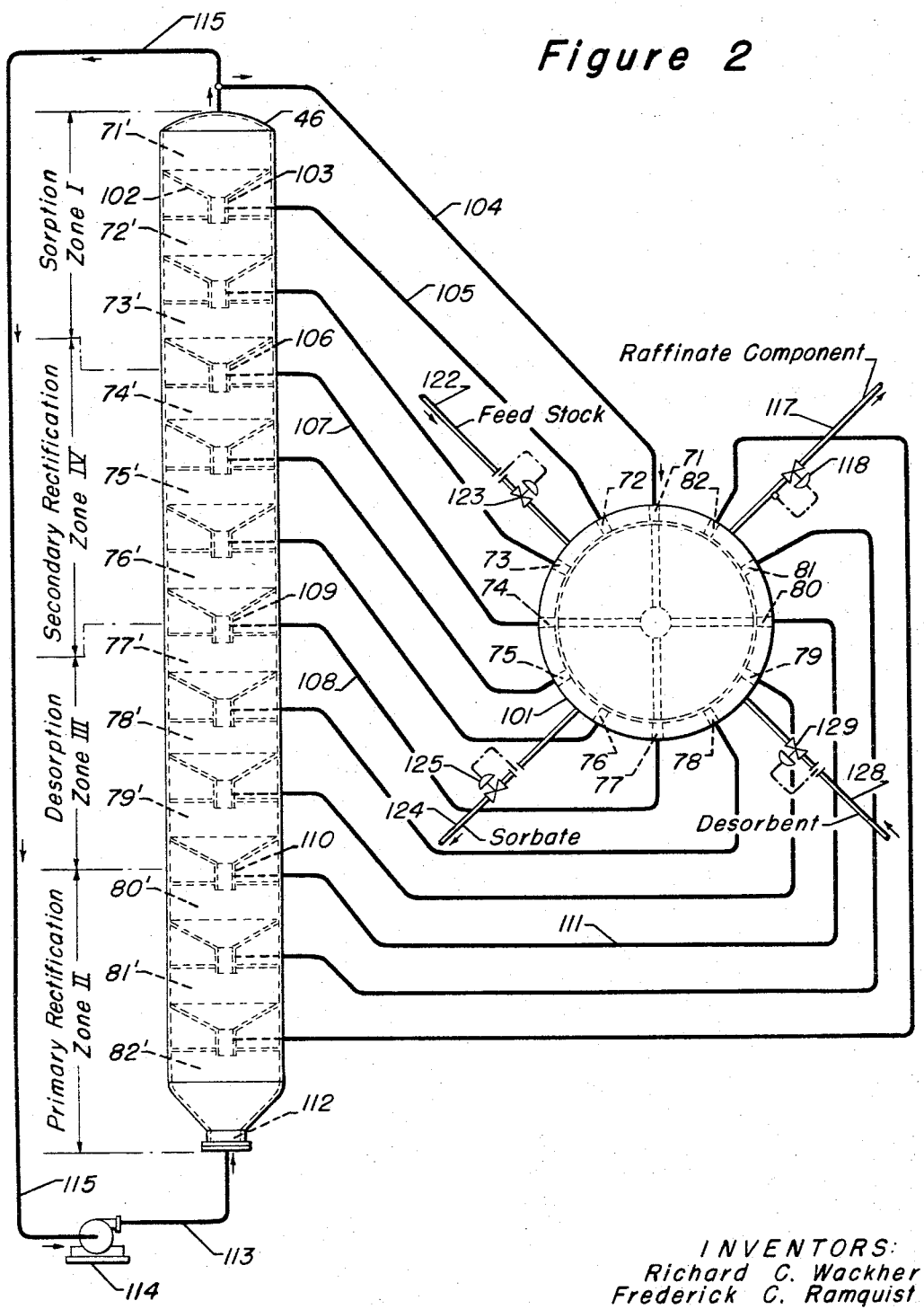

3,340,316
SEPARATION OF AROMATIC HYDROCARBONS USING AN IMPROVED ACTIVATED CARBON SORBENT
Richard C. Wackher, Palatine, and Frederick C. Ramquist, Stickney, Ill., assignors to Universal Oil Products Company, Des Plaines, Ill., a corporation of Delaware
Filed June 19, 1964, Ser. No. 376,541
7 Claims. (Cl. 260—674)

ABSTRACT OF THE DISCLOSURE

Separation of aromatics, particularly polynuclear aromatics, by means of activated carbon containing a polar fluoride molecule having as a cation ammonia or an element from Groups I, II and III of the Periodic Table.

This invention relates to a process for the separation of aromatic hydrocarbons from a fluid mixture employing an improved activated carbon. This invention also relates to an improved activated carbon having enhanced selectivity for the sorption of aromatic hydrocarbons. More specifically, this invention relates to a process for the separation of aromatic hydrocarbons from a fluid mixture by contact with an activated carbon in which at least one polar fluoride molecule having cations selected from the group consisting of hydrogen, alkali metals, alkaline earth metals, ammonium, boron and aluminum is incorporated into the activated carbon. Still more specifically, this invention relates to the step of incorporating at least one polar fluoride molecule having cations selected from the group consisting of hydrogen, alkali metals, alkaline earth metals, ammonium, boron and aluminum into an activated carbon sorbent so as to enhance the selectivity of the sorbent for adsorption of aromatic hydrocarbons on said sorbent. Further, this invention relates to an activated carbon sorbent having incorporated therein at least one polar fluoride molecule having cations selected from the group consisting of hydrogen, alkali metals, alkaline earth metals, ammonium, boron and aluminum.

In one of its embodiments this invention relates to a method for improving the selectivity of an activated carbon selective for aromatic organics which comprises incorporating upon said activated carbon at least one polar fluoride molecule having cations selected from the group consisting of hydrogen, alkali metals, alkaline earth metals, ammonium, boron and aluminum.

In another of its embodiments this invention relates to a process for the separation of components of a fluid mixture at least one of which is selectively sorbed by contact with a solid activated carbon, said process comprising the steps: introducing said fluid mixture into contact with a bed of solid activated carbon particles; withdrawing from said bed a first effluent comprising relatively less sorbed component of said fluid mixture; introducing a desorbing fluid comprising another selectively sorbed component into contact with said bed of solid activated carbon particles; withdrawing from said bed a second effluent comprising selectively sorbed component of said fluid mixture; and maintaining on said activated carbon at least one polar fluoride molecule having cations selected from the group consisting of hydrogen, alkali metals, alkaline earth metals, ammonium, boron and aluminum.

In another of its embodiments this invention relates to a process for the separation of aromatic hydrocarbons from a fluid hydrocarbon mixture, said process comprising the steps: introducing said fluid hydrocarbon mixture into contact with a bed of solid activated carbon particles selective for aromatic hydrocarbons; withdrawing from said bed a first effluent comprising relatively less sorbed component of said fluid hydrocarbon mixture; introducing a desorbing fluid comprising another aromatic hydrocarbon into contact with said bed of solid activated carbon particles; withdrawing from said bed a second effluent comprising selectively sorbed component of said fluid hydrocarbon mixture; and maintaining on said activated carbon at least one polar fluoride molecule having cations selected from the group consisting of hydrogen, alkali metals, alkaline earth metals, ammonium, boron and aluminum.

In still another of its embodiments this invention relates to a process for the separation of components of a fluid mixture at least one of which is selectively sorbed by contact with a solid activated carbon, said process comprising the steps: introducing said fluid mixture into a first zone of a fixed bed of solid activated carbon containing at least four serially interconnected zones having fluid flow connecting means between adjacent zones and between the outlet of one terminal zone and the inlet of the other terminal zone in the series to thereby provide cyclic fluid flow in said process; substantially simultaneously withdrawing relatively less sorbed raffinate from a second zone immediately downstream of said first zone; substantially simultaneously introducing a desorbing fluid into a third zone immediately downstream of said second zone; substantially simultaneously withdrawing resulting sorbate comprising selectively sorbed components from a fourth zone immediately downstream of said third zone; continuously circulating a stream of fluid through said series of interconnected zones; periodically advancing downstream the point in said fixed bed of introducing said fluid mixture while simultaneously and equally advancing downstream the point of introducing desorbent and withdrawing raffinate and sorbate; and maintaining on said sorbent at a desired concentration at least one polar fluoride molecule having cations selected from the group consisting of hydrogen, alkali metals, alkaline earth metals, ammonium, boron and aluminum.

In another of its embodiments this invention relates to an activated carbon having enhanced selectivity for aromatic hydrocarbons which comprises a porous activated carbon particle having incorporated therein at least one polar fluoride molecule containing cations selected from the group consisting of hydrogen, alkali metals, alkaline earth metals, ammonium, boron and aluminum.

In a more specific embodiment this invention relates to the step of incorporating upon said activated carbon at least one polar fluoride molecule having cations selected from the group consisting of hydrogen, alkali metals, alkaline earth metals, ammonium, boron and aluminum in a process for the separation of polynuclear aromatics from fluid mixtures employing solid activated carbon.

It is well known that certain porous, large surface area adsorbents, such as certain activated carbons, activated clays, silica gel, activated aluminas and magnesia, etc., are effective separating agents capable of selectively retaining, by what are believed to be electrostatic forces, certain polar and unsaturated classes of organic compounds, permitting the saturated and relatively less polar compounds of a mixture of organic compounds to pass over or through a bed of the adsorbent particles without retention thereby. Thus, aromatic hydrocarbons are generally adsorbed by activated adsorbents of the foregoing type and retained thereby, while saturated hydrocarbons, such as paraffins and naphthenes which may occur in admixture with the aromatic components, flow through the adsorbent without retention by the solid adsorbent.

Activated carbon differs in certain essential respects from other species or adsorbents such as activated alumina, clay and silica gel in being selectively adsorptive of polynuclear aromatics in the presence of mononuclear types such as alkyl benzenes and/or other classes of hydrocarbons. Thus, activated carbon is more selective for bicyclic aromatic hydrocarbons than for the monocyclic species in contrast to silica gel.

In a particular adsorption apparatus the selectivity of the sorbent is a critical factor. Selectivity for one component in contrast to one other component (selectivity factor) is hereby defined to means the weight of said one component on the sorbent divided by the weight of said other component on the sorbent divided by the weight of said one component in the mixture in equilibrium with the sorbent divided by the weight of said other component in the mixture in equilibrium with sorbent. If it is desired to separate said one component from said other component employing a sorbent, the higher the selectivity factor, the easier it will be to achieve the separation. Therefore, with a particular apparatus the selectivity factor of the sorbent will determine the allowable charge rate of feed stock through the apparatus. Improvement in the selectivity factor will result in a more economical operation and will result in enhanced purity. It is accordingly an object of this invention to present a method for improving the selectivity factor of activated carbon.

Another limitation on activated carbon as a sorbent in a commercial separation process is its structural instability. Efficient separating activated crabon particles are generally constructed of a porous, friable struggle and when a mass of such particles are moved relative to an enclosure containing the same or when the particles are moved relative to adjacent particles, the mass of particles rapidly undergoes attrition and the particles, once in discrete granular form, are reduced to a mass of powder which can result in plugging of other equipment and restrict or channel the circulation of fluid through the mass. It is accordingly another object of this invention to present a simulated countercurrent process which will maintain the activated carbon particles in discrete particulate while exhibiting enhanced extractive capacity due to improvements in the selectivity factor.

Processes for the separation of aromatic hydrocarbons using selective sorbents are well known in the prior art. For example, a process for the separation of polynuclear from mononuclear aromatics employing silica gel as a selective sorbent is presented in U.S. Letters Patent No. 2,395,491, issued on Feb. 26, 1946. The concept of the use of moving inlets and outlets to simulate countercurrent flow of sorbent and feed is shown in U.S. Letters Patent No. 2,985,589, issued on Mar. 23, 1961.

It is an object of this invention to produce an activated carbon having an enhanced selectivity factor for aromatic hydrocarbons. It is another object of this invention to produce an activated carbon having an enhanced selectivity factor for polynuclear aromatic hydrocarbons. It is a further object of this invention to provide a process for the separation of aromatic hydrocarbons from fluid mixtures. It is a still further object of this invention to provide a process for the separation of aromatic hydrocarbons from fluid mixtures by contact with an activated carbon sorbent selective for said aromatic hydrocarbons having enhanced selectivity for aromatics. It is still another object of this invention to provide a simulated countercurrent process for the separation of aromatic hydrocarbons from fluid mixtures employing activated carbon having enhanced selectivity. It is a still further object to present a method to enhance the selectivity for aromatic hydrocarbons.

Typical forms of activated carbon found to be suitable for use in the present process are the various wood charcoals, especially the charcoals prepared from nutshells, fruit pits and seed pod hulls. A preferable activated charcoal is prepared from bituminous coal. Other suitable sources of charcoals for use herein are the carbonized residues of woody plant life, particularly the hardwoods such as maple, oak, teak, etc. Although charcoals prepared by carbonization of materials may be initially derived from a large variety of sources including coal, fruit pits, corn cobs, petroleum acid sludges, etc., charcoals prepared from materials which yield granular particles of a size range of from about 10 to about 250 mesh, and more preferably from about 15 to about 50 mesh, are especially preferred herein since the larger particles permit fluid flow through a bed of the particles without channeling and with less pressure drop than charcoals of smaller size particles. In order to reduce channeling to a minimum during operation of the process, the sorbent particles are desirably of substantially uniform size within a range of about 10 mesh, the sorbent preferably being sifted to eliminate fines and oversized particles.

The charging stocks which may be utilized in the separation process of this invention may be derived from thermal or catalytically cracked materials, catalytically dehydrogenated petroleum fractions, etc. and straight-run distillate fractions. Charging stocks of exceptionally high aromatic content may, if desired, be diluted with a non-adsorbable hydrocarbon diluent, preferably a lower boiling non-aromatic hydrocarbon solvent of low viscosity, such as pentane, hexane, heptane, octane, etc., prior to charging the feed stock into the present process flow. Certain higher boiling fractions in which polynuclear aromatics occur, such as those present in petroleum fractions boiling above the gasoline range, contain relatively large quantities of aromatic components. Thus, many kerosene, middle distillate and gas oil boiling range fractions of petroleum or its conversion products have been found to contain up to 50% or more of aromatic components of both mononuclear and polynuclear structure. The mononuclear species in the higher boiling fractions are generally alkylbenzenes, whereas the polynuclear aromatics are generally naphthalene, phenanthrene, anthracene and their alkyl-substituted derivatives. There are also non-polycyclic aromatic components present which have more than one cyclic structure per molecule but which are either not fully dehydrogenated or have less than six carbon atoms per cycle such as tetralin, indane, indene and their alkyl-substituted derivatives. The present charge stock may be initially derived from a straight-run fraction which has subsequently been subjected to thermal or catalytic dehydrogenation. It may also be derived from a petroleum fraction having a low concentration of polynuclear and/or mononuclear aromatic of which the desired product is the non-aromatic fraction. For example, the polynuclear aromatic hydrocarbons present in high boiling petroleum fractions are considered to be undesirable components when the fraction is to be utilized as fuel in a jet engine; hence, a fraction containing polynuclear aromatics may be subjected to the present separation process for the specific purpose of removing the generally objectionable polynuclear aromatic components. In addition, polynuclear aromatic hydrocarbons are of considerable commercial value when separated and purified, particularly in the dye industry as starting materials for the preparation of dyes and in other industries as the source of raw materials for insecticides, etc. Thus, a material of relatively little value as a component in a hydrocarbon motor fuel may be separated by the present process from the more desirable hydrocarbon components of the fraction and made available as a valuable raw material for other chemical processes. Another application of the present process is the preparation of a polynuclear aromatic hydrocarbon concentrate from a feed stock, such as a light cycle oil recovered from a catalytic cracking process, the concentrate thereafter being charged to a hydrodealkylation process for the ultimate production of pure naphthalene. The elimination of monocyclic aromatics and non-polycyclic aromatics from such a feed stock greatly reduces the consumption of hydrogen in the hydrodealkylation stage of the process cycle.

The present process is also characterized as a cyclic and continuous process. It is thereby intended to define a method in which the various inlet and outlet streams are charged and withdrawn continuously without interruption with respect to either the flow rate or composition of the several streams. Although the bed of solid adsorbent particles remains in substantially fixed or stationary position within the adsorptive separation column, the feed and desorbent inlets and the product withdrawal outlets, into and from the column, are shifted in a downstream direction in equal increments. The granular activated carbon sorbent being a material which readily powderizes when set in motion relative to adjacent sorbent particles or relative to the equipment in which the separation is effected, may be maintained in a fixed position since the shifting of the inlet and outlet streams will result in a simulated countercurrent flow of solid and fluid.

The essence of this invention involves the step of incorporating and maintaining on the sorbent at least one polar fluoride molecule having cations selected from ammonium and elements of the group consisting of Groups I, II and III of the Periodic Table. Among the preferable cations from Group I are hydrogen, lithium, sodium and potassium. Among the preferable cations from Group II are magnesium, calcium and zinc. Among the preferable cations from Group III are boron and aluminum. This incorporation step may be readily accomplished by methods such as contacting the activated carbon particles with an aqueous treating solution containing the desired fluoride compound or passing a gaseous fluoride compound through a bed of activated carbon. This treating step may be accomplished at room temperature or even at elevated temperatures. It is preferable that good contacting procedure be followed by methods such as agitation and mixing in order to insure uniform distribution of the fluoride compound over the activated carbon particles. The resulting particles are then activated by passing dry nitrogen or other dry gas over the carbon particles while maintaining temperatures of about 200° C. Further, preferable treating methods are hereinafter described in Examples I through IV.

It has been observed that the incorporation of the above-mentioned fluoride compound into the porous structure of the activated carbon particles has a profound effect upon the selectivity of the activated carbon particles as an adsorbent. More specifically, said incorporation results in the greater preference for aromatic hydrocarbons over the more saturated hydrocarbons and also results in the greater preference for polynuclear aromatic hydrocarbons over mononuclear aromatic hydrocarbons. This improved activated carbon adsorbent may be efficiently utilized into a separation process such as that shown in FIGURE 1 to enhance the performance of said process.

In a preferred embodiment this invention is presented in a simulated countercurrent process for the separation of polynuclear aromatic hydrocarbons from a fluid hydrocarbon mixture. One of the essential parts of the preferable embodiment is sorbent contacting chamber 46 shown in FIGURE 1 which contains the activated carbon particles. Said chamber is capable of having introduced to it continuously a feed mixture and a desorbing fluid while simultaneously having withdrawn a relatively less sorbed raffinate and a sorbate. Sorbent contacting chamber 46 represents any suitable apparatus comprising a series of fixed beds or, if desired, one single continuous bed of sorbent having fluid flow connecting means between the outlet of one bed and the inlet of its next adjacent bed and comprising suitable means, such as a valve or manifold, for shifting the points of inlet and outlet for the various feed and product streams involved in the process. FIGURE 2 illustrates one of the preferred contacting chamber designs being particularly suitable because of its compact arrangement of the series of fixed beds in adjacent relationship to each other. The series of fixed beds may be a number (at least four) of horizontally spaced, separate beds interconnected by a pipe between the bottom of one bed and the top of its upstream adjacent bed, or the beds may be stacked one upon another within a suitable vertical column as illustrated in FIGURE 2 herein referred to in its entirety as contacting chamber 46 containing suitably shaped partitioning means which divide the column into a series of adjacent contacting beds such as beds 71' through 82', each bed being divided from its adjacent contacting beds (except the uppermost and lowermost beds) by a funnel-shaped partitioning member such as partition 102 located between beds 71' and 72' having upcomer 103 of restricted cross-sectional area opening from bed 72' into downstream subadjacent bed 71'.

An essential portion of this part of the process, essential, that is, to the realization of simulated countercurrent flow of solid and liquid, is the provision of a suitable programming device for changing the points of inlet and outlet into and from the contacting chamber and for advancing each of these points in a downstream direction during the operation of this part of the process. Any suitable form of fluid distribution center such as a manifold arrangement of valves and incoming and outgoing lines may be provided with timed, electrically operated switches to open and close appropriate valves. The programming principle may also be suitably effected by means of a plug valve of particular design such as that rotary valve described and claimed in U.S. Patent No. 3,040,777, issued on June 26, 1962.

Valve 101, representing a suitable programming device, contains a number of fluid inlet and outlet ports, 71 through 82, which are connected to the contacting beds in chamber 46 by flow conduits such as 104, 105, 107, 108 and 111. As shown in FIGURE 2, the feed stock is introduced through flow conduit 122, through valve 101 which is positioned to send the feed stock through port 74 and flow conduit 107 and into upcomer 106 and finally into bed 73'. The rate of introduction of feed stock through flow conduit 122 is controlled by suitable flow control, for example, employing an orifice in flow conduit 122 causing a pressure drop across said orifice, and suitable detection equipment to detect the pressure drop, compare said pressure drop to a preselected presure drop and having an error signal actuate a control valve thus achieving flow control. The sorbate is withdrawn from upcomer 109 through flow conduit 108 into port 77 and out flow conduit 124 under similar flow control as described above. The desorbent is introduced through flow conduit 128, through valve 101 which is positioned to send the feed stock through port 80 and flow conduit 111 into upcomer 110 and finally into bed 79' under similar flow control as described above. The raffinate is withdrawn from flow conduit 104, through port 71, through valve 101 and out flow conduit 117. The rate of withdrawal of raffinate through flow conduit 117 is controlled by a suitable pressure control device such as an instrument which senses the pressure in chamber 46 and actuates a control valve to maintain a constant preselected pressure. A continuous stream of fluid is circulated from the chamber through flow conduit 115, through pump 114 and back into the chamber through flow conduit 113 thus maintaining fluid circulation through all the beds in the column.

Simulated countercurrent flow is achieved by periodically advancing downstream the point of introducing the feed stock and the desorbent while simultaneously and equally advancing downstream the point of withdrawal of raffinate and sorbate. This concept may be illustrated by reference to FIGURE 2. After a preselected time period the valve will rotate in such a manner that the feed stock enters chamber 46 between beds 72' and 73' since flow conduit 122 is now connected to port 73; sorbent is withdrawn between beds 75' and 76' since flow conduit 124 is now connected to port 76; desorbent is introduced between beds 78' and 79' since flow conduit 128 is now connected to port 79; and raffinate is withdrawn between beds 81' and 82' since flow conduit 117 is connected to port 82. Thus, by viewing FIGURE 2 and imaging that the valve has rotated one port in a clockwise direction, the inlets and outlets have been shifted downstream one bed. The continual shifting of the rotary valve will then accomplish the desired simulated countercurrent flow. This latter concept may be further illustrated using a relatively simple concept. Standing on the ground outside of chamber 46, it is clear to an observer that the activated carbon sorbent does not move but is stationary. However, if the observer were placed inside chamber 46 and upon the solid sorbent, he would have the appearance of moving since the fluid in contact with the sorbent is continually changing. This equipment arrangement has the feature of making the sorbent think it is moving.

The sorbent contacting chamber may also be visualized as being a series of four interconnected zones of a single fixed bed of solid sorbent having no actual line of demarcation between each of the zones other than the zone boundaries defined by the points of inlet and withdrawal for the various fluid streams. In either case, all the zones are defined from the points of inlet and withdrawal. The sorption zone I in FIGURE 2 is defined as the zone bounded between the feed stock inlet and the raffinate outlet; the primary rectification zone II in FIGURE 2, as the zone bounded between the raffinate outlet and the desorbent inlet; the desorption zone III in FIGURE 2, as the zone bounded between the desorbent inlet and the sorbate outlet; and the secondary rectification zone IV in FIGURE 2, as the zone bounded between the sorbate outlet and the feed stock inlet.

The desorbent is a material which is capable of displacing from the solid sorbent the aromatic or polycyclic aromatic component of the feed stock adsorbed on the activated carbon by virtue of a previous cycle of operation. The sorbate effluent stream thus comprises a mixture of excess desorbent and sorbate previously adsorbed from the feed stock in a prior cycle of operation and released from the adsorbent by contact with the desorbent stream. The displacing action of the desorbent is primarily a Mass Action effect, the desorbent being charged in sufficient quantity to provide a molar ratio of desorbent to sorbate still residing on the sorbent in contact therewith at any given point at least greater than one to one and preferably in an amount sufficient to provide a desorbent to sorbate molar ratio of from about two to one to about ten to one, although in some instances the ratio may be as high as thirty to one.

The preferred desorbents utilizable herein are those compounds which are sorbed on the sorbent less tenaciously than the sorbate component of the feed stock but which desorb the sorbate when supplied to the desorption zone at a rate sufficient to provide a molar excess of desorbent relative to sorbate on the particles of sorbent and surrounded with desorbent. In the case of separating polycyclic aromatic or heavy aromatic compounds, a typical class of material having such desorptive properties is the mononuclear aromatic hydrocarbons and their lower alkyl-substituted derivatives, particularly the lower molecular weight species of this class of compounds which, because of their lower boiling points, are readily separated by distillation from the mixture of desorbent and sorbate removed from the sorbent particles as sorbate effluent. Thus, benzene, toluene, xylene, cumene, ethylbenzene, etc. are especially preferred because of their low boiling point relative to polycyclic aromatics and heavier aromatics. Thus, the desorbent is readily recovered from the effluents as a low boiling overhead fraction in an auxiliary distillation unit. Since, however, the desorbent is charged into the upstream point of the desorption zone and flows downstream, countercurrent to the sorbent stream containing displaced sorbate, partially reactivated sorbent is contacted with the more active desorbent at the inlet of the desorbent stream; that is, the desorbent stream contains the lowest concentration of polycyclic aromatic (or heavy aromatic) sorbate and therefore the highest desorbent to sorbate ratio at the point at which the desorbent enters the desorption zone. Since the rate of desorption is dependent upon the Mass Action effect and thus dependent upon the molar proportion of desorbent to sorbate in the fluid surrounding the sorbent particles, true countercurrent desorption takes place and the last traces of sorbate are removed from the sorbent particles at the upstream point of the desorption zone.

The sorbent contacting chamber is operated at conditions of temperature, pressure and under other process conditions which depend upon the particular feed stock involved, the particular sorbent utilized and the required purity of product. Although this chamber may be operated either in the liquid or vapor phase, in many cases it is preferable to operate in the liquid phase. In general, in liquid phase operations the pressure is less than when employing gaseous phase conditions, the latter dependent upon, generally, the molecular weight of the feed stock components. Typical liquid phase operation is, for example, temperatures of from 30° to 700° F., and more particularly from 300° to 500° F. and pressures of from slightly superatmospheric to 30 atmospheres or higher depending primarily upon the feed stock. Generally higher pressures will be employed for lower molecular weight feed stocks to maintain liquid phase in the contacting chamber. In many cases it will be desirable to operate at conditions which will maintain the inlet and outlet fluids in the liquid phase but will maintain relatively lower viscosity to avoid excess pressure drop through the packed beds of sorbent as well as permit a more rapid rate of sorption and desorption. It is within the scope of this invention to utilize different temperatures in different zones of the fixed beds to take advantage of the rate of sorption and desorption due to differences in properties of the feed stock and the desorbent. This may be accomplished, for example, by heating one of the inlet streams or by heating both but to different temperatures prior to entering the contacting chamber.

The maximum charge rate of feed stock through the fixed bed of solid sorbent is limited by the tolerable pressure drop through said fixed bed and the rate of sorption of the selectively sorbed component. The minimum charge rate of feed stock through said fixed bed is limited to a rate sufficient to avoid back mixing (i.e., to maintain substantially plug flow through said beds). These rates will be dependent upon the type of charge stock used and the conditions of pressure and temperature employed in the operation of the sorbent contacting chamber. It is convenient to use the concept of space velocity in defining the ratio of feed stock charge rate to quantity of sorbent. The term liquid hourly space velocity will be used herein and is defined as the charge rate of feed stock at conditions of 60° F. and one atmosphere in cubic feet per hour divided by the cubic feet of solid activated carbon sorbent. It is expected that liquid hourly space velocities of from about 0.01 to about 2.0 will be employed depending upon the operating conditions of pressure and temperature, the feed stock, the polar fluoride molecule and the equipment limitations.

Referring back to FIGURE 1, the raffinate flowing in flow conduit 117 is introduced into raffinate fractionator 20. The overhead fraction is removed through flow conduit 21, cooler 22 and into overhead receiver 23. A portion of the overhead is returned to fractionator 20 as reflux by means of flow conduit 24. The net overhead is removed from overhead receiver 23 through flow conduit 25. In this particular arrangement the net overhead comprises a portion of the desorbent. The bottom fraction is removed through flow conduit 26 where a portion flows through flow conduit 27, heater 28 and returns to fractionator 20. The net bottoms fraction leaves the system through flow conduit 29 and comprises the relatively less sorbed fraction of the feed stock.

The sorbate fraction leaves sorbent contacting chamber through flow conduit 124 where it flows into sorbate fractionator 30. The overhead fraction is removed through flow conduit 31, cooler 32 and into overhead receiver 33. A portion of the overhead is returned to fractionator 30 as reflux by means of flow conduit 34. The net overhead is removed from overhead receiver 33 by means of flow conduit 35. The bottoms fraction is removed through flow conduit 36 where a portion flows through flow conduit 37, heater 38 and returns to fractionator 30. The net bottoms fraction leaves the system through flow conduit 39 and comprises the selectively sorbed fraction of the feed stock.

The net overheads from fractionator 20 and fractionator 30 are combined in flow conduit 40 and comprise the desorbent. The flow scheme here envisioned employs a desorbent lighter than the feed stock. However, the process would function equally well if the desorbent were heavier than the feed stock except that the bottoms fraction would then comprise the desorbent. The combined desorbent flows through flow conduit 40 through desorbent inventory vessel 53 and flow conduit 128 where it returns to sorbent contacting chamber 46.

Using the above-described process, the operational results may be typically illustrated by introducing a charge stock as shown in column 1 of Table I into flow conduit 122. The composition of the relatively less sorbed raffinate leaving flow conduit 29 is shown in column 2 of Table I. The composition of the selectively sorbed sorbate leaving flow conduit 39 is shown in column 3 of Table I. These results illustrate the preference of activated carbon for the polycyclic aromatic hydrocarbons as shown by the large increase in alkylnaphthalene concentration in the sorbate effluent.

TABLE I

| Streams | Charge Stock | Raffinate | Sorbate |
| --- | --- | --- | --- |
| Gravity, ° API | 30.2 | 37.0 | 9.9 |
| Aromatic Types Analysis Liquid Volume, Percent: | | | |
| Alkyl Benzenes | 10.0 | 13.5 | 2.0 |
| Indanes and Tetralins | 14.0 | 17.4 | 4.5 |
| Indenes | 1.4 | 1.5 | 1.0 |
| Naphthalene and Alkyl Naphthalenes | 18.7 | 1.8 | 81.4 |
| Acenaphthenes and Biphenyls | 2.3 | 0.5 | 8.6 |
| Dihydroanthracenes | 0.4 | 0.1 | 1.2 |
| Total Aromatics | 46.8 | 34.8 | 98.7 |
| Paraffins | 32.5 | 39.1 | 0.8 |
| Naphthenes | 20.7 | 26.1 | 0.5 |
| | 100.0 | 100.0 | 100.0 |

*Example I*

Thirty-two grams (2.66 g. moles) of activated carbon particles prepared from bituminous coal is contacted with an aqueous solution containing 0.142 g. moles of potassium fluoride. The resulting mixture is agitated on a 15 r.p.m. motor for three hours, washed several times with water and drained. The resulting particles are activated by contact with a dry nitrogen purge for two hours at 200° C. Laboratory analysis of the activated particles shows a surface area of 877 m.$^2$/g. and a pore volume of 0.50 cm.$^3$/g.

A hydrocarbon mixture composed of 8.9 wt. percent diisopropylbenzene, 9.1 wt. percent α-methylnaphthalene and 82.0 wt. percent isooctane and weighing 21.2 grams is contacted with 11.8 grams of the above-mentioned KF incorporated activated carbon in a glass bomb at 100° C. This mixture is maintained in intimate contact until equilibrium is achieved whereupon the liquid effluent is removed from the glass bomb. The effluent is analyzed by liquid chromatography analysis and is composed of 8.1 wt. percent diisopropylbenzene, 1.8 wt. percent α-methylnaphthalene and 90.1 wt. percent isooctane.

From these results selectivity factors as hereinbefore defined are calculated and are presented in line 1 of Table II. It should be noted that there is an improvement in the selectivity factor for α-methylnaphthalene (polynuclear aromatic) over diisopropylbenzene (mononuclear aromatic) and over isooctane (non-aromatic) in the case of the KF incorporated activated carbon adsorbent than in the case of the untreated activated carbon (line 5 of Table II).

*Example II*

Activated carbon particles weighing 33.8 grams and prepared from bituminous coal are contacted with an aqueous solution containing 0.197 g. moles of ammonium fluoride. The resulting particles are then agitated and activated as described in Example I. Laboratory analysis of the activated particles shows a surface area of 893 m.$^2$/g. and a pore volume of 0.49 cm.$^3$/g.

A hydrocarbon mixture composed of 8.9 wt. percent diisopropylbenzene, 9.1 wt. percent α-methylnaphthalene and 82.0 wt. percent isooctane and weighing 21.9 grams is contacted with 12.1 grams of the NH$_4$F incorporated activated carbon in a glass bomb at 100° C. This mixture is maintained in intimate contact until equilibrium is achieved whereupon the liquid effluent is removed from the glass bomb. The effluent is analyzed by liquid chromatography analysis and is composed of 9.7 wt. percent diisopropylbenzene, 1.7 wt. percent α-methylnaphthalene and 88.6 wt. percent isooctane. Selectivity factors for the NH$_4$F incorporated particles are calculated and presented in line 2 of Table II.

*Example III*

Activated carbon particles weighing 34.4 grams and prepared from bituminous coal are contacted with an aqueous solution containing 0.295 g. moles of hydrogen fluoride. The resulting particles are then agitated and activated as described in Example I. Laboratory analysis of the activated particles shows a surface area of 1038 m.$^2$/g. and a pore volume of 0.51 cm.$^3$/g.

A hydrocarbon mixture composed of 9.2 wt. percent diisopropylbenzene, 8.8 wt. percent α-methylnaphthalene and 82.0 wt. percent isooctane and weighing 26.6 grams is contacted with 12.2 grams of the HF incorporated carbon in a glass bomb at 100° C. This mixture is maintained in intimate contact until equilibrium is achieved whereupon the liquid effluent is removed from the glass bomb. The effluent is analyzed by liquid chromatography analysis and is composed of 8.8 wt. percent diisopropylbenzene, 2.3 wt. percent α-methylnaphthalene and 88.9 wt. percent isooctane. Selectivity factors for the HF incorporated particles are calculated and presented in line 3 of Table II.

*Example IV*

Activated carbon particles weighing 35.7 grams and prepared from bituminous coal are contacted with gaseous BF$_3$ for a three-hour period. The resulting particles are then activated by contact with a dry nitrogen purge for two hours at 200° C. Laboratory analysis of the activated particles shows a surface area of 842 m.$^2$/g. and a pore volume of 0.47 cm.$^3$/g.

A hydrocarbon mixture composed of 9.2 wt. percent diisopropylbenzene, 8.8 wt. percent α-methylstyrene and 82.0 wt. percent isooctane and weighing 26.3 grams is contacted with 12.4 grams of the BF$_3$ incorporated activated carbon in a glass bomb at 100° C. This mixture is maintained in intimate contact until equilibrium is achieved whereupon the liquid effluent is removed from the glass bomb. The effluent is analyzed by liquid chromatography analysis and is composed of 8.8 wt. percent diisopropylbenzene, 2.5 wt. percent α-methylnaphthalene and 88.7 wt. percent isooctane. Selectivity factors for the BF$_3$ incorporated particles are calculated and presented in line 4 of Table II.

The untreated activated carbon particles are prepared from bituminous coal and similar tests as described in Examples I through IV are performed upon it. The resulting selectivity factors are presented in line 5 of Table II. It is apparent that the ammonium fluoride incorporated activated carbon shows the largest improvement in selectivity factor, and in comparison with the untreated carbon, the selectivity for the polynuclear α-methylnaphthalene to the mononuclear diisopropylbenzene was increased from 10.3 to 17.0 or 65% while the selectivity for the α-methylnaphthalene to the paraffin 2,2,4-trimethylpentane (isooctane) was increased from 17.2 to 38.8 or 125%.

TABLE II

| Incorporation Material | Selectivity factor for α-methylnaph-thalene over diisopropylbenzene | Selectivity factor for α-methylnaph-thalene over isooctane |
| --- | --- | --- |
| Potassium Fluoride | 12.8 | 31.3 |
| Ammonium Fluoride | 17.0 | 38.8 |
| Hydrogen Fluoride | 12.5 | 27.3 |
| Boron Trifluoride | 11.7 | 26.3 |
| None | 10.3 | 17.2 |

We claim as our invention:

1. A method for separating an aromatic from a fluid mixture containing the same which comprises contacting said mixture with activated carbon containing at least one polar fluoride molecule having a cation selected from the group consisting of ammonium and elements of the group consisting of Groups I, II and III of the Periodic Table to increase the selectivity of the activated carbon for aromatics.

2. The process of claim 1 further characterized in that the polar fluoride molecule is ammonium fluoride.

3. A method for separating an aromatic from a fluid mixture containing the same which comprises contacting said mixture with activated carbon containing at least one polar fluoride molecule having a cation selected from the group consisting of hydrogen, potassium, boron and ammonium to increase the selectivity of the activated carbon for aromatics.

4. A process for the separation of an aromatic hydrocarbon from a fluid hydrocarbon mixture containing the same, said process comprising the steps:

introducing said fluid hydrocarbon mixture into contact with a bed of solid activated carbon particles selective for aromatic hydrocarbons, withdrawing from said bed a first effluent comprising relatively less sorbed component of said fluid hydrocarbon mixture, introducing a desorbing fluid comprising another aromatic hydrocarbon into contact with said bed of solid activated carbon particles, withdrawing from said bed a second effluent comprising selectively sorbed component of said fluid hydrocarbon mixture, and maintaining on said activated carbon during the contacting of said hydrocarbon mixture therewith at least one polar fluoride molecule having a cation selected from the group consisting of hydrogen, alkali metals, alkaline earth metals, ammonium, boron and aluminum to increase the selectivity of the activated carbon for aromatics.

5. A process for the separation of a polynuclear aromatic hydrocarbon from a fluid hydrocarbon mixture containing mononuclear and polynuclear aromatic hydrocarbons, said process comprising the steps:

introducing said fluid hydrocarbon mixture into contact with a bed of solid activated carbon particles selective for polynuclear aromatics, withdrawing from said bed a first effluent comprising relatively less sorbed component of said fluid hydrocarbon mixture, introducing a desorbing fluid comprising an aromatic hydrocarbon into contact with said bed of solid activated carbon particles, withdrawing from said bed a second effluent comprising selectively sorbed polynuclear aromatic hydrocarbons, and maintaining on said activated carbon during the contacting of said hydrocarbon mixture therewith at least one polar fluoride molecule having a cation selected from the group consisting of hydrogen, alkali metals, alkaline earth metals, ammonium, boron and aluminum to increase the selectivity of the activated carbon for polynuclear aromatics.

6. A process for the separation of an aromatic hydrocarbon from a fluid hydrocarbon mixture containing the same which comprises contacting said mixture with activated carbon containing at least one polar fluoride molecule having a cation selected from the group consisting of hydrogen, alkali metals, alkaline earth metals, ammonium, boron and aluminum to increase the selectivity of the activated carbon for aromatics.

7. A process for the separation of a polynuclear aromatic from a fluid mixture containing mononuclear and polynuclear aromatics which comprises contacting said mixture with activated carbon at least one polar fluoride molecule having a cation selected from the group consisting of hydrogen, alkali metals, alkaline earth metals, ammonium, boron and aluminum to increase the selectivity of the activated carbon for polynuclear aromatics.

References Cited

UNITED STATES PATENTS

| | | | |
| --- | --- | --- | --- |
| 1,219,438 | 3/1917 | Catlin | 252—444 |
| 1,803,943 | 5/1931 | Miller | 252—444 |
| 2,063,623 | 12/1936 | Pier et al. | 252—447 |
| 2,395,491 | 2/1946 | Mavity | 260—674 |
| 2,518,236 | 8/1950 | Hirschler | 260—674 |
| 2,691,053 | 10/1954 | Woolf | 252—444 |
| 2,848,379 | 8/1958 | Rehner et al. | 260—674 |
| 2,877,176 | 3/1959 | Wolff et al. | 260—674 |
| 2,985,589 | 5/1961 | Broughton et al. | 210—34 |

DELBERT E. GANTZ, *Primary Examiner.*

C. E. SPRESSER, *Assistant Examiner.*